United States Patent [19]

Park

[11] Patent Number: 5,386,241
[45] Date of Patent: Jan. 31, 1995

[54] SIGNAL TRANSFORMATION SYSTEM AND METHOD FOR PROVIDING PICTURE-IN-PICTURE IN HIGH DEFINITION TELEVISION RECEIVERS

[75] Inventor: Hak-Jae Park, Incheon, Rep. of Korea

[73] Assignee: Daewoo Electronics Co., Ltd., Seoul, Rep. of Korea

[21] Appl. No.: 133,665

[22] Filed: Oct. 7, 1993

[30] Foreign Application Priority Data

Oct. 7, 1992 [KR] Rep. of Korea ............. 92-18393

[51] Int. Cl.⁶ ................... H04N 5/262; H04N 7/12
[52] U.S. Cl. .................................. 348/565; 348/407
[58] Field of Search ............... 358/133, 135, 136, 11, 358/12, 21 R, 22 PIP; H04N 2/262, 7/12; 348/565, 568, 699, 407, 403, 404

[56] References Cited

U.S. PATENT DOCUMENTS

| | | | |
|---|---|---|---|
| 4,139,860 | 2/1979 | Micic et al. | 358/22 PIP |
| 4,982,288 | 1/1991 | Isobe et al. | 348/568 X |
| 5,121,205 | 6/1992 | Ng et al. | 348/568 |
| 5,157,743 | 10/1992 | Maeda et al. | 358/12 |
| 5,202,760 | 4/1993 | Tourtier et al. | 358/141 |

*Primary Examiner*—Victor R. Kostak
*Attorney, Agent, or Firm*—William F. Pinsak

[57] ABSTRACT

The present invention relates to a novel method and system for providing high definition television receivers with a picture-in-picture (PIP) feature through the use of a reduced number of transform coefficients. The system comprises first decoding unit for decoding a main picture signal, second decoding unit for decoding a picture-in-picture signal by using a reduced number of transform coefficients including a d.c. coefficient, and position control means for providing a composite image composed of the main picture and the picture-in-picture on the screen. Interpolation of pixel data is performed by applying appropriate weight factors on neighboring pixel data based on the spatial relationship between the pixels and the heads generated by reduced motion vectors.

10 Claims, 8 Drawing Sheets

| DC | X |   |   |   |   |   |   |
|----|---|---|---|---|---|---|---|
| X  | X |   |   |   |   |   |   |
|    |   |   |   |   |   |   |   |
|    |   |   |   |   |   |   |   |
|    |   |   |   |   |   |   |   |
|    |   |   |   |   |   |   |   |
|    |   |   |   |   |   |   |   |
|    |   |   |   |   |   |   |   |

FIG. 7

SIGNAL TRANSFORMATION SYSTEM AND METHOD FOR PROVIDING PICTURE-IN-PICTURE IN HIGH DEFINITION TELEVISION RECEIVERS

FIELD OF THE INVENTION

The present invention relates to a high definition television receiver having a picture-in-picture feature; and, more particularly, to a novel system and method for providing a high definition television receiver with a picture-in-picture feature through the use of a reduced number of transform coefficients.

DESCRIPTION OF THE PRIOR ART

Television sets having the feature of picture-in-picture (PIP) are gaining popularity as the PIP function enables the viewer to watch two or more pictures on the screen simultaneously. Assuming that two pictures are shown, the main picture is seen through a normal (or main) channel, while the second PIP picture is received through a second channel or from another source such as video cassette recorder (VCR), video camera, etc. The PIP is reduced in both the lateral and vertical sizes to, e.g., ½, respectively, of the screen for the simultaneous display of both the main picture and the PIP. The PIP can be placed at one of several predetermined subareas on the screen and shifted therebetween. The viewer may independently select channel(s) and/or other video sources; and, when desired, switch between the main picture and the PIP. The PIP feature, which has been implemented in conventional analog television receivers and VCRs, is popular because it can be used to scan other available programs while watching the main picture or it allows the user to watch two programs at a time.

Figure 1A:
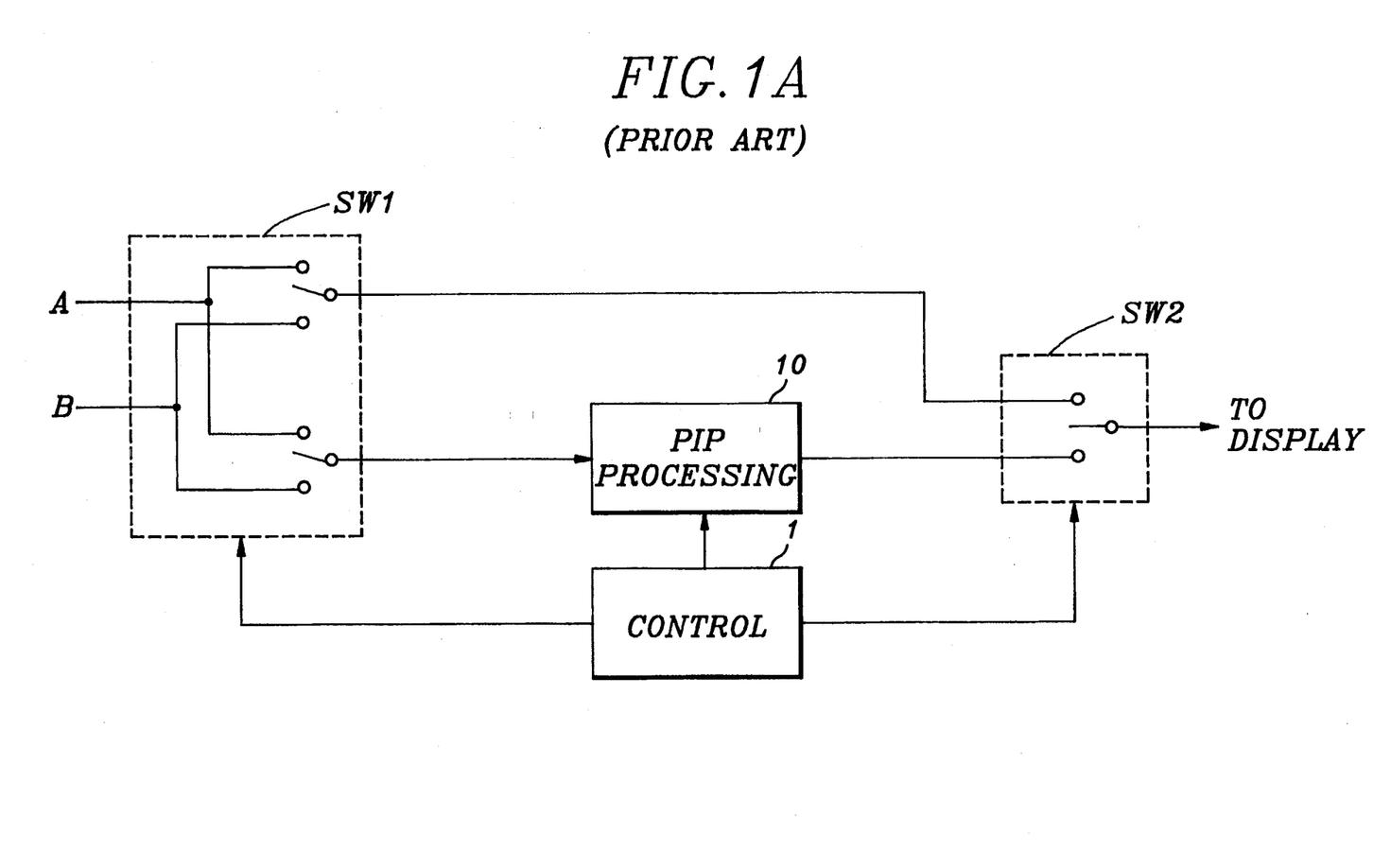
FIG. 1A shows a conventional analog signal processing apparatus for providing a PIP feature.
Figure 1B:
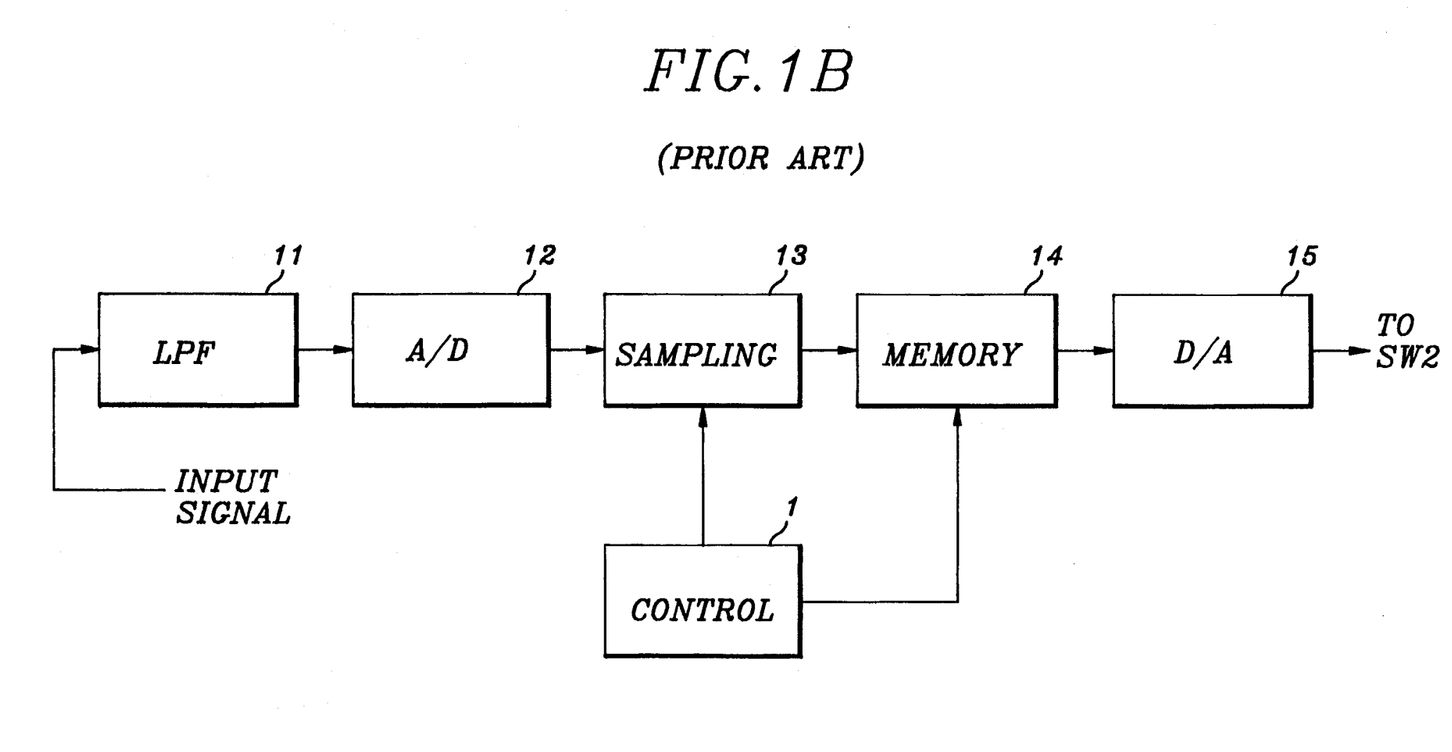
FIG. 1B describes a detailed block diagram of a PIP processing block in FIG. 1A.

Referring to FIG. 1A, there is illustrated an exemplary conventional image signal processing apparatus for performing the PIP feature. Each of the input signals A and B denotes any analog video signal from a channel or other video source such as VCR and video camera. The two input signals A and B can be independently selected by the viewer through the use of appropriate control means such as a remote controller (not shown). The input signals fed to a first switching block SW1 are switched between the main picture and the PIP under the control of a control block 1 in response to a viewer's instruction. In a PIP processing block 10, as shown in FIG. 1B, video signal A or B selected by the switching block SW1 is filtered by a low-pass filter (LPF) 11 to prevent spurious effects known as aliasing. The filtered analog signal is then converted into a digital form in a analog-to-digital (A/D) converter 12 for subsequent sampling process. The sampling rate of a sampling block 13 is determined by the size of the PIP. When the PIP is reduced ½ in both the vertical and the horizontal sizes of the main picture, for instance, the sampling block 13 subsamples digital pixel data in a ratio of 1 out of 2. The sampled digital data from the sampling block 13 is then written onto a memory 14. The sampling and writing processes are controlled by the control block 1. The stored data in the memory 14 are read and applied to a digital-to-analog (D/A) converter 15 for conversion thereof into an analog signal. The main picture signal from the switching block SW1 and the PIP signal from the D/A converter 15 are fed to a second switching block SW2 in FIG. 1A for the generation of a composite image of the main picture and the PIP. The reading of the stored data from the memory 14 and the switching between the main picture and the PIP in the switching block SW2 are regulated by the control block 1 in synchronism with the scanning frequency of the main picture in such a manner that the composite image is provided with the PIP at a predetermined subarea of the screen.

Figure 2:
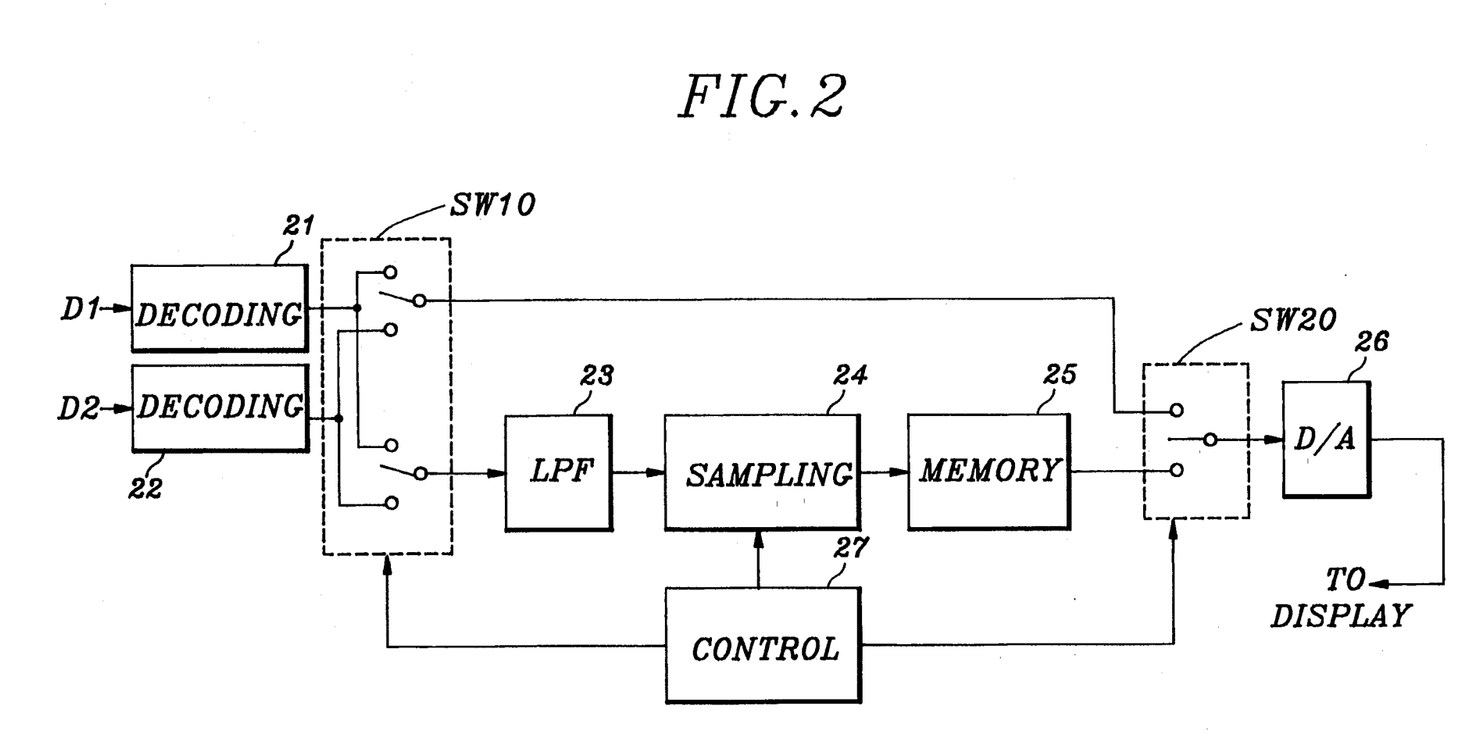
FIG. 2 depicts a block diagram of a system adapting the conventional analog signal processing scheme as shown in FIG. 1A to a HDTV receiver.

Adaptation of the PIP feature of conventional television receivers into high defition television (HDTV) receivers will require such a system as shown in FIG. 2, wherein input signals D1 and D2 denote demultiplexed encoded digital signals. Each of the signals D1 and D2 can be from any high video sources such as a tuner, VCR, video camera, etc. Numerals 21 and 22 denote decoding units, each of which carries out decoding process of the encoded digital signals D1 and D2, respectively. Details of the decoding units 21 and 22 will be described hereinafter. The functions of the other components SW10, 23, 24, 25, 27, SW20 and 26 are identical to those of their corresponding components shown in FIGS. 1A and 1B. That is, one of the decoded signals in the decoding unit 21 or 22 is selected in a switching block SW10 as the main picture and applied directly to a switching block SW20. The other signal selected in the switching block SW10 as the PIP is fed to LPF 23 for low-pass filtering. The filtered signal is sampled in a sampling block 24 and written onto a PIP memory 25. The switching block SW20 selectively scans the main picture data in a frame memory (not shown) in the decoder 21 or 22 and the PIP data in the PIP memory 25 to provide a composite image of the main Picture and the PIP at a predetermined subarea of the screen. The composite image data is then converted to an analog signal in a D/A converter 26 and sent to a screen for display. In FIG. 2, an A/D converter is not present and the D/A converter 26 is placed after the switching block SW20, which are a consequence of the fact that the input signals A and B are all digitalized.

Transmission of digitalized television signals can deliver video images of much higher quality than the transmission of analog signals. When an image signal comprising a sequence of image "frames" is expressed in a digital form, a substantial amount of data need to be transmitted, especially in the case of a high defition television (HDTV) system. Since, however, the available frequency bandwidth of a conventional transmission channel is limited, in order to transmit substantial amounts of digital data, e.g., about 900 Mbits per second, through the limited channel bandwidth, e.g., of 6 MHz, it is inevitable to compress the image signal. Among various video compression techniques, the so-called hybrid coding technique, which combines spatial and temporal compression techniques, is known in the art to be a most effective compression technique.

One of the common hybrid coding techniques employs a motion-compensated DPCM (Differential Pulse Code Modulation), two-dimensional DCT (Discrete Cosine Transform), quantization of DCT coefficients, RLC (Run-Length Coding) and VLC (Variable Length Coding). Specifically, in the motion-compensated DPCM, an image frame is divided into a plurality of subimages (or blocks). The size of a block typically ranges between 8×8 and 32×32 pixels. The motion-compensated DPCM is a process of determining the movement of an object between a current frame and its previous frame, and predicting the current frame according to the motion flow to produce a predictive error signal representing the difference between the current frame and its prediction. This method is described, for example, in Staffan Ericsson, "Fixed and Adaptive Predictors for Hybrid Predictive/Transform Coding", *IEEE Transactions on Communications, COM-33*, No. 12 (December 1985); and in Ninomiya and Ohtsuka, "A Motion-Compensated Interframe Coding Scheme for Television Pictures", *IEEE Transactions on Communications, COM-30*, No. 1 (January 1982).

The two-dimensional DCT converts a block of digital image signal, for example, a block of 8×8 pixels, into a set of transform coefficient data. This technique is described in Chen and Pratt, "Scene Adaptive Coder", *IEEE Transactions on Communications, COM-32*, No. 3 (March 1984). By processing such transform coefficient data with a quantizer, zigzag scanning, RLC and VLC, the data to be transmitted can be effectively compressed. The motion vectors obtained by the motion-compensated DPCM are also coded by VLC.

Referring back to FIG. 2, each of the decoding units 21 and 22, therefore, includes a variable length decoder, a run-length decoder, an inverse zigzag scanner, an inverse quantizer, an inverse DCT means, a frame memory for storing previous frame data, a motion compensator and an adder for generating current block data from the previous frame data, motion vector and prediction error data. Furthermore, since these components of the decoding units 21 and 22 operate at a very high speed pixel clock frequency ranging upto, e.g., 50–70 MHz and, especially, the inverse DCT means performs a substantial amount of complicated calculations, the decoding units 21 and 22 tend to be costly and of a very complicated structure. Moreover, HDTV having a PIP feature requires two such decoding units together with a LPF 23 and a sampling block 24 also operating at a high speed pixel clock frequency as shown in FIG. 2, which are not easy to be implemented.

SUMMARY OF THE INVENTION

It is, therefore, an object of the invention to provide an improved decoding method and system for providing a picture-in-picture (PIP) capability in a HDTV receiver, by utilizing a reduced number of transform coefficients but without performing a sampling process for the implementation of the PIP feature.

In accordance with the present invention, there is presented a novel digitized video signal processing method for offering a main picture and a picture-in-picture simultaneously on a common display screen, comprising the steps of: decoding a main picture signal in a first decoding means; decoding a picture-in-picture signal by using a reduced number of transform coefficients including a d.c. coefficient in a second decoding means; and providing a composite image composed of the main picture and the picture-in-picture on the screen.

Further, in accordance with the present invention, there is disclosed a novel digitized video signal processing system for offering a main picture and a picture-in-picture simultaneously on a common display screen, comprising: first decoding means for decoding a main picture signal; second decoding means for decoding a picture-in-picture signal by using a reduced number of transform coefficients including a d.c. coefficient; and position control means for providing a composite image composed of the main picture and the picture-in-picture on the screen.

In accordance with one aspect of the invention, the PIP is generated by utilizing a simplified decoding unit incorporating a reduced size inverse DCT means without performing a sampling process.

In accordance with another aspect of the present invention, interpolation of pixel data of the PIP is performed by applying appropriate weight factors on neighboring pixels of preceding PIP frames based on the spatial relationship between modified motion vectors of the PIP and their corresponding neighboring pixels.

BRIEF DESCRIPTION OF THE DRAWINGS

The above and other objects and features of the present invention will become apparent from the following description of preferred embodiments given in conjunction with the accompanying drawings in which.

DETAILED DESCRIPTION OF THE PREFERRED EMBODIMENTS

Figure 3:
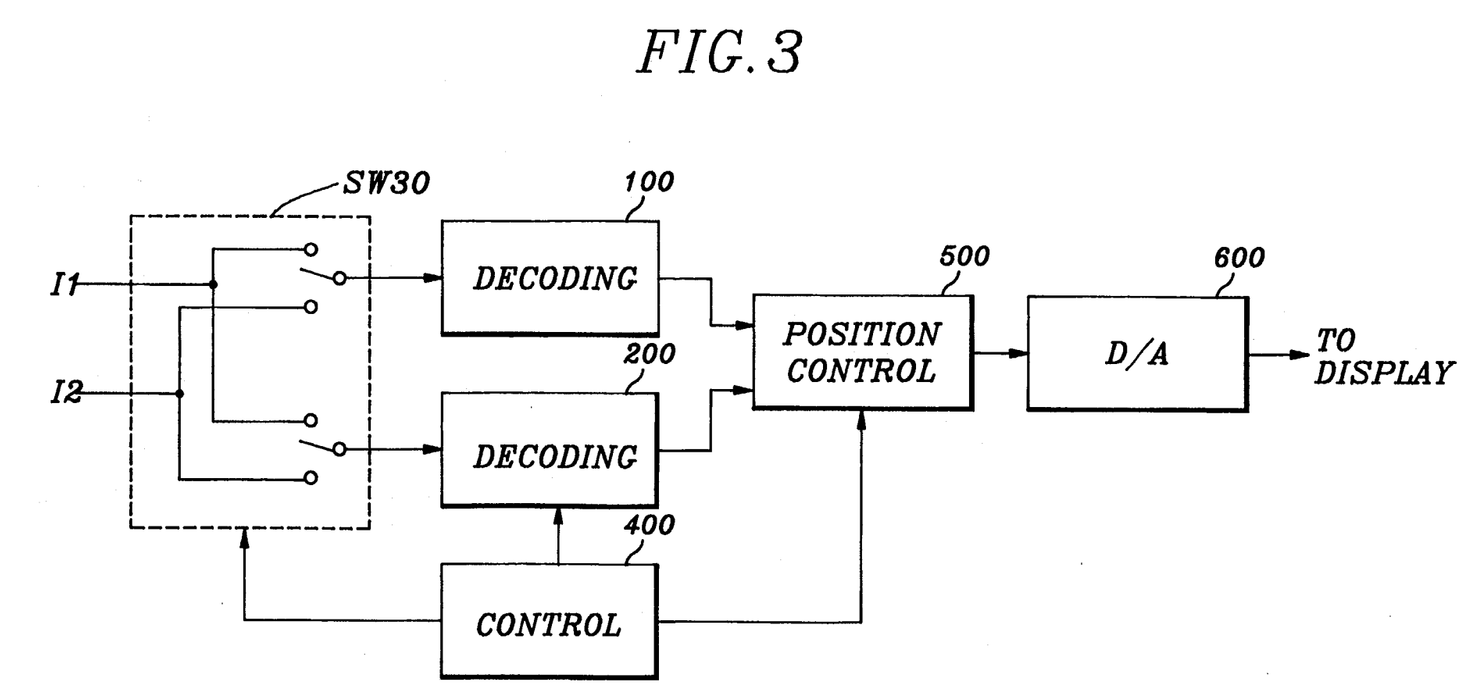
FIG. 3 represents a block diagram of a system in accordance with the present invention for providing a PIP feature in a HDTV receivers.

Turning now to FIG. 3 wherein there is shown a decoding system for providing a PIP feature in HDTV receivers, encoded digital signals I1 and I2 are inputted to a switching block SW30. Each of the input signals I1 and I2 can be any compressed bit stream encoded in the same manner as is done in a HDTV transmitter. For instance, the input signals can be from tuner(s) of television receivers and/or VCRs or any other prerecorded video source encoded in a HDTV standard. The switching block SW30 switches I1 and I2 between the main picture and the PIP under the control of a control block 400. The selected main picture signal I1 or I2 is fed to a first decoding unit 100 for subsequent decoding process. The decoded signal then stored in a first frame memory 46 shown in FIG. 4.

On the other hand, the PIP signal I2 or I1 from the switching block SW30 is applied to a second decoding unit 200. The PIP signal is then decoded and stored in a second frame memory 56 shown in FIG. 5 under the control of the control block 400 in accordance with the invention. Details of the decoding units 100 and 200 will be described with reference to FIGS. 4 and 5. A position control block 500 reads data from the first and the second frame memories 46 in FIG. 4 and 56 in FIG. 5 in such a timely manner that it can generate a composite signal of the main picture and the PIP, the latter being displayed at a predetermined subarea of the screen, under the control of the control block 400. The composite signal from the position control block 500 is converted into an analog signal at the D/A converter 600 and transferred for display.

Figure 4:
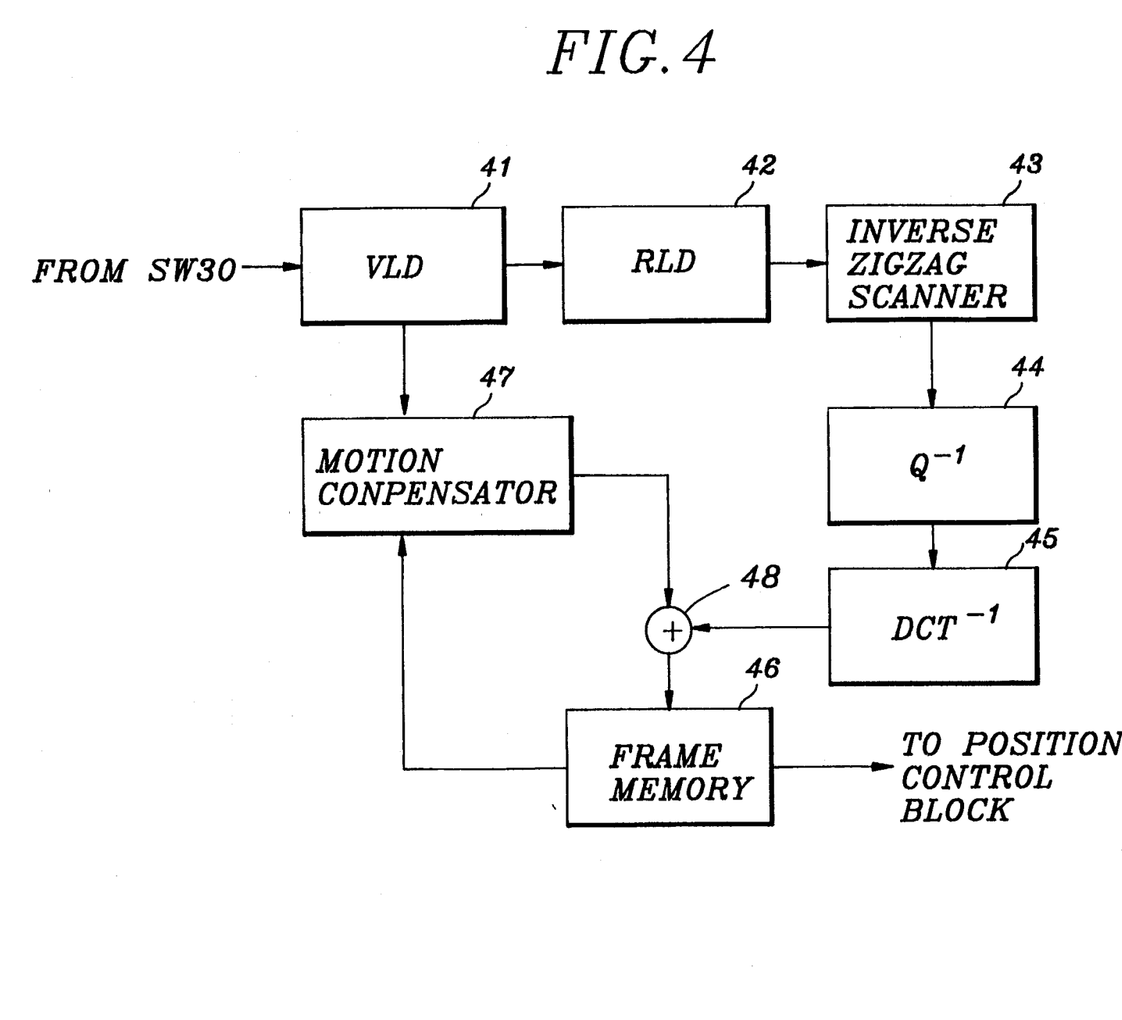
FIG. 4 illustrates the details of a first decoding unit 100 in FIG. 3 for processing the main picture.

FIG. 4 illustrates in detail the first decoding unit 100 in FIG. 3 for performing a main picture signal processing. The input signal I1 or I2 includes variable length coded motion vector data and a DPCM signal which is a difference signal between a block of the current frame and a corresponding block of its preceding frame after motion compensation. A variable length decoder (VLD) 41 decodes variable length coded DPCM and motion vector data to send the DPCM data to a run-length decoder (RLD) 42 and the motion vector data to a motion compensator 47. The VLD 41 is basically a look-up table: that is, in VLD 41, a plurality of code sets is provided to define a respective relationship between each variable length code and its run-length code or motion vector. The DPCM data decoded to a run-length code is applied to RLD 42, which is also a look-up table, for generating quantized DCT coefficients. In an inverse zigzag scanner 43, the quantized DCT coefficients are reconstructed to provide an original block of, e.g., 8×8 quantized DCT coefficients. A block of quantized DCT coefficients is converted into a set of DCT coefficients in an inverse quantizer $Q^{-1}$ 44 and fed to an inverse discrete cosine transformer $DCT^{-1}$ 45 which transforms the set of DCT coefficients into a set of difference data between a block of the current frame and its corresponding block of the previous frame. The difference data from $DCT^{-1}$ 45 is then sent to an adder 48.

In the meanwhile, the variable length decoded motion vector from VLD 41 is fed to the motion compensator 47. The data from the corresponding block of the previous frame is extracted from a first frame memory 46 which stores the main picture and sent to the motion compensator 47 and applied to the adder 48. The corresponding block data of the previous frame devived from the motion compensator 47 and the set of difference data from $DCT^{-1}$ 45 are summed in the adder 48 to constitute a block signal of the current frame and written onto the first frame memory 46.

Figure 5:
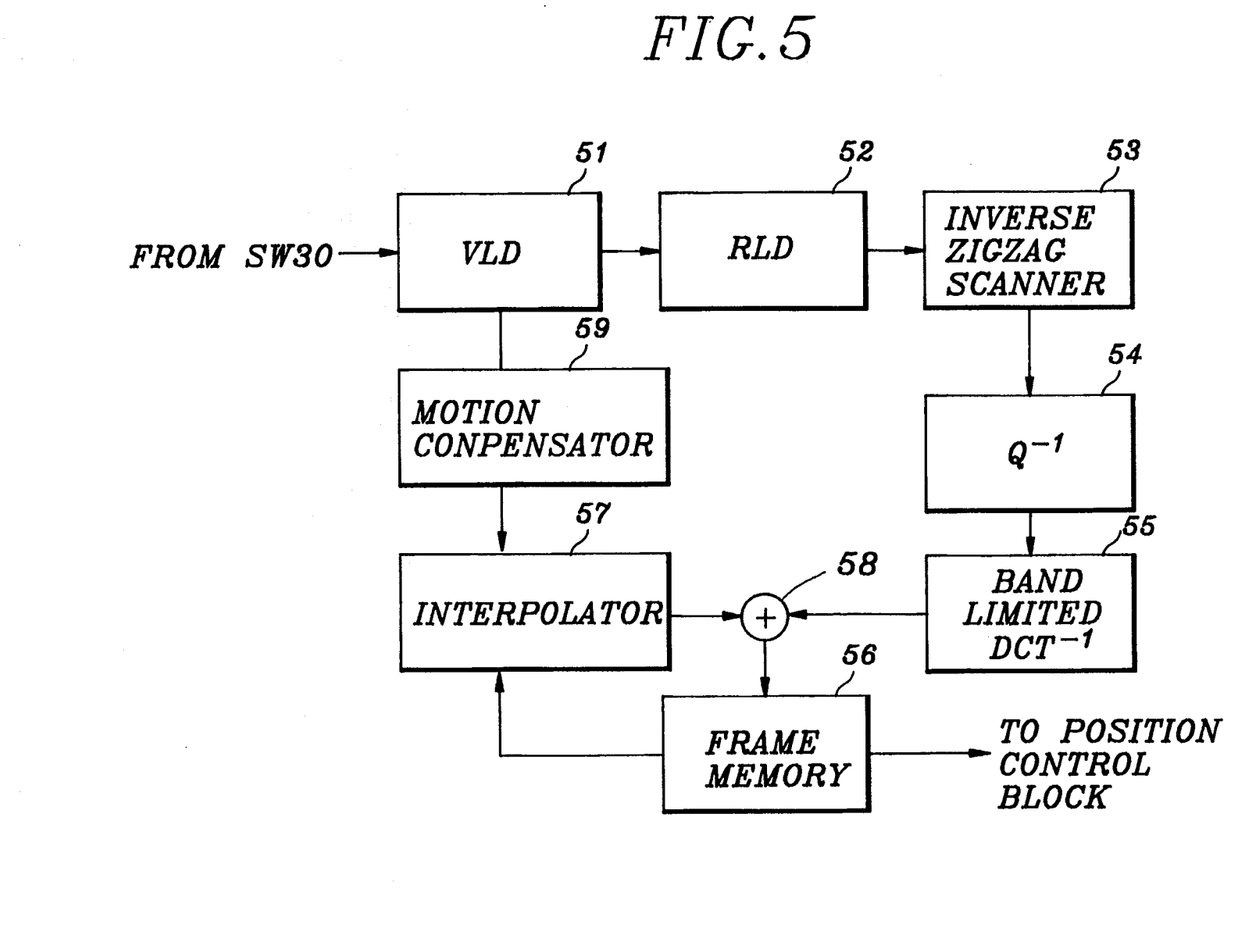
FIG. 5 offers the details of a second decoding unit 200 in FIG. 3 for processing a PIP.

In FIG. 5, there are illustrated the details of the second decoding unit 200 in FIG. 3 for performing the PIP signal processing in accordance with the present invention. The input signal I2 or I1 also includes variable length coded motion vector data and a DPCM signal of the PIP. Decoding processes in VLD 51, RLD 52, inverse zigzag scanner 53 and inverse quantizer $Q^{-1}$ 54 are identical to those in the corresponding components thereof in FIG. 4, respectively, and, therefore, are not described for the sake of simplicity.

In the same manner as in FIG. 4, the inverse-quantized DCT transform coefficients of the PIP are provided from the inverse quantizer $Q^{-1}$ 54 to a band-limited $DCT^{-1}$ 55 which converts the DCT coefficients to a set of difference data in accordance with the present invention.

The DCT transform coefficients have a statistic distribution in the frequency region between a d.c. component zone to a high frequency zone with non-zero or significant transform coefficients mainly appearing in the low frequency zone and the zero or insignificant transform coefficients appearing mainly in the high frequency zone. These high frequency components may be truncated or do not have to be utilized in generating reduced images such as the PIP. Sometimes it may be advantageous to utilize the lower frequency zone only to reproduce a PIP image in order to avoid the aliasing effect mentioned at the outset.

As well known in the art, the DCT transform coefficients of a set of two-dimensional transform coefficients represent ever-increasing frequency components along a zigzag scanning path starting from a d.c. value located at the top-left corner of the set. In accordance with a preferred embodiment of the invention, a reduced DCT block including a d.c. coefficient is utilized in producing the PIP image.

Figure 6:
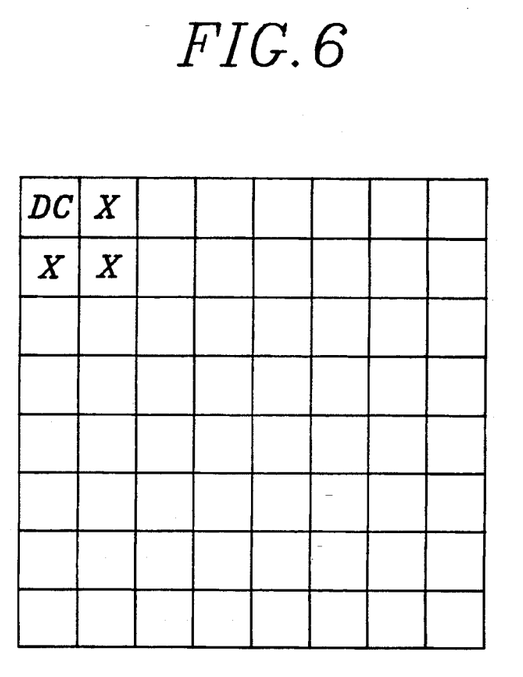
FIG. 6 represents a reduced DCT coefficient zone used in the second decoding unit for generating a PIP in accordance with the present invention.

Referring to FIG. 6, there is illustrated an inverse DCT scheme performed in the band-limited $DCT^{-1}$ 55 shown in FIG. 5 in accordance with the invention. Supposing now that the DCT coefficients are of a 8×8 block, they represent 8×8 pixels as well known in the art. When the PIP is reduced to 1/N, in both the vertical and the horizontal lengths of the main picture (N=2, 4 or 8 in this case), the number of pixels of the PIP is also reduced to 1/N in both the vertical and the horizontal directions. In the preferred embodiment of the invention, 8/N×8/N, for example, 2×2 with N=4, DCT coefficients including a d.c. coefficient are converted into a set of pixel difference data. FIG. 6 illustrates a reduced 2×2 block of DCT coefficients at the top-left corner of the 8×8 block for performing an inverse DCT when N=4. When the maximum size of the PIP is one quarter of the screen, that is N=2, the second decoding unit 200 in FIG. 3 can be implemented in an economic fashion since the band-limited $DCT^{-1}$ 55 performs a maximum 4×4, instead of 8×8, inverse DCT calculation with a processing speed reduced by a factor of about 4.

Referring back to FIG. 5, 8/N×8/N pixel difference data is fed to the adder 58 from the band-limited $DCT^{-1}$ 55. In the meantime, the motion vector MV, specifically, a horizontal vector component MVH and a vertical vector component MVV, is modified into MV/N in the motion compensator 59 to compensate the reduced size of the PIP and fed to an interpolator 57. The motion vector MV reduced by a factor of N does not always coincide with the pixel positions of the reduced PIP frame stored in the second frame memory 56; and, therefore, a set of pixel data of the previous PIP frame is interpolated in accordance with the invention by the interpolator 57 and applied to the adder 58. Details of the interpolation process will be described hereinafter with reference to FIG. 7. The difference data from the band-limited $DCT^{-1}$ 55 and the interpolated pixel data from the interpolator 57 are added up to provide 8/N×8/N block signal of the current PIP frame and written onto the second frame memory 56.

Figure 7:
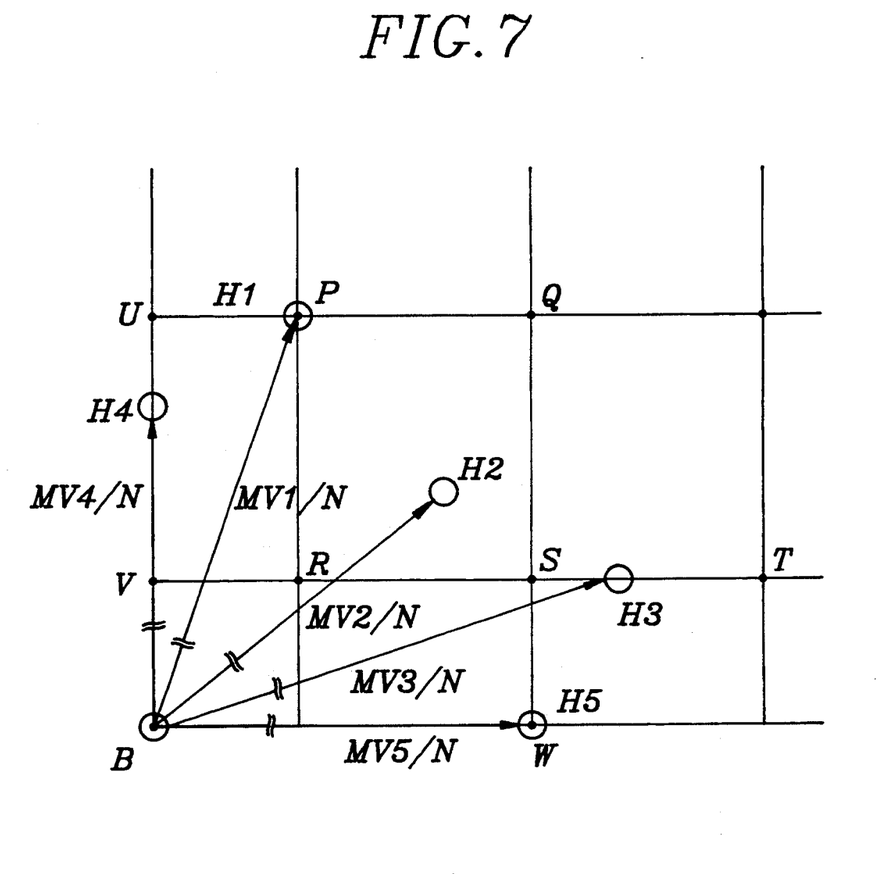
FIG. 7 explains an interpolation of pixel data performed in the second decoding unit in accordance with the invention.

In FIG. 7, there is illustrated a spatial relationship between a pixel of a current PIP frame and pixels on its preceding PIP frame operated by a reduced motion vector MV/N. By definition, as well known in the art, a motion vector operates from the base, which is a current pixel projected on its preceding frame, to the head which is a pixel on the preceding frame. In FIG. 7, $MVi/N (i=1,2,3,4,5)$ denotes a reduced motion vector operating from the base B to the head $Hi(i=1,2,3,4,5)$ respectively; B, P, Q, R, S, T, U, V and W are pixels on the preceding PIP frame denoted by closed circles; and open circles signify the base B and heads Hi's.

In a preferred embodiment of the invention, pixel data of a head Hi is derived directly from a pixel alone when Hi coincides therewith. For instance, H1 is derived from P, while H5 is derived from W and so on.

Each of the pixel data of such heads that fall on a vertical or horizontal line connecting pixels as H3 or H4 is derived from its two neighboring pixels on the line by multiplying appropriate weight factors thereto. For instance, H3 is derived from two pixels, e.g., S and T; and H4, from U and V.

In a situation wherein a head is situated inside a square formed by four nearest pixels therefrom, the pixel data thereof is interpolated from those four pixels by applying suitable weight factors thereto. The pixel data of H2, for instance, is derived from four pixels, e.g., P, Q, R and S.

In the preferred embodiment of the present invention, the weight factors are determined based on the reversed ratio of distances between the head of a reduced motion vector and its two or four neighboring pixels. For example, the interpolated pixel data DH3 of a head H3 is obtained by summing the pixel data DS of S multiplied by a weight factor of TH3/(SH3+TH3) and the pixel data DT of T multiplied by a weight factor of SH3/(SH3+TH3), wherein SH3 is the distance between S and H3; TH3, the distance between T and H3. In other words, a larger weight factor is applied to a closer pixel in accordance with the preferred embodiment. Similarly, the interpolated pixel data DH2 of a head H2 is obtained by multiplying $(PH2+QH2+RH2+SH2)^{-1}$ to the sum of $DP \times SH2$, $DQ \times RH2$, $DR \times QH2$ and $DS \times PH2$, wherein DP, DQ, DR and DS are pixel data of P, Q, R and S, respectively; PH2, QH2, RH2 and SH2, distances between H2 and P, Q, R and S, respectively, with $PH2 > QH2 > RH2 > SH2$.

Referring back to FIGS. 3 and 5, the reduced motion vector by a factor of N is fed from the motion compensator 59 to the interpolator 57 wherein the aforementioned interpolation process is performed. The interpolated pixel data from the interpolator 57 is added to the pixel difference data from the band-limited $DCT^{-1}$ 55 in the adder 58 and written onto the second frame memory 56 for storing the PIP signal. The size of the PIP can be changed by the control signal from the viewer through the control block 400 which controls the processes in the motion compensator 59, the interpolator 57, and the band-limited $DCT^{-1}$ 55 by regulating the process parameter N. The position control block 500 in FIG. 3 reads the main picture signal from the first frame memory 46 in FIG. 4 and the PIP signal from the second frame memory 56 in FIG. 5 by switching signals from the control block 400 in a timely manner to thereby provide a composite image signal of the main picture and the PIP, the latter appearing at one of the predetermined subareas of the screen. It is also possible to display the main picture alone by reading the main picture signal only from the first frame memory 46, following the viewer's command. The image signal is converted into an analog form in the D/A converter 600 and transferred therefrom for display.

As a result, there is provided the novel method and system capable of providing high definition television receivers with the PIP feature, wherein the generation of the PIP is performed by using a reduced number of DCT coefficients, thereby eliminating the need of employing a complicated and costly digital low pass filter and the sampling process, and enabling the adaptation of a simplified PIP decoding unit. Interpolation of pixel data is performed by applying appropriate weight factors on neighboring pixel data based on the spatial relationship between the pixels and the heads generated by reduced motion vectors.

It should be appreciated that the weight factors, which are inversely proportional to the distances between a given head and its two or four nearest pixels in the preferred embodiment of the invention, may be chosen in different manners: for instance, they may be chosen to be inversely proportional to the square of the ratio of distances as long as use of such weight factors turns out to be more conducive to the reproduction of better picture images.

Further, decimation of DCT transform coefficients into a reduced number of transform coefficients may be carried out in a decoding stage preceding the band-limited $DCT^{-1}$, for instance, in either run-length decoding, inverse zigzag scanning or inverse quantization stage, by way of processing some of the bit streams of the input block data corresponding to a reduced number of transform coefficients.

The invention may also be applicable to any other digital video equipment such as a digital VCR having HDTV tuner(s) and adopting a similar standard as HDTV.

While the present invention has been described with respect to certain preferred embodiments only, other modifications and variations may be made without departing from the spirit and scope of the present invention am set forth in the following claims.

What is claimed is:

1. A method for use in a digitized video signal decoder having first and second decoding means, for providing a main picture and a picture-in-picture simultaneously on a screen from a plurality of digital video signals received from transmitters, wherein each of the digital video signals received has been compressed by using a coding technique involving a motion-compensated differential pulse code modulation and two dimensional discrete cosine transform, the first decoding means includes a first frame memory for storing current and previous frames of the main picture, and the second decoding means includes a second frame memory for storing current and previous frames of the picture-in-picture, said method comprising the steps of:

selecting a main picture signal and a picture-in-picture signal from the plurality of digital video signals;

decoding the main picture signal at the first decoding means;

decoding the picture-in-picture signal at the second decoding means by using a set of reduced motion vectors and a reduced number of transform coefficients; and providing a composite image of the main picture and the picture-in-picture from the first and the second frame memories.

2. The method according to claim 1, wherein said step of decoding the main picture signal includes the steps of:

converting said main picture signal into first multiple sets of $P \times Q$ transform coefficients and a first multiple number of motion vectors, wherein each of the first multiple number of motion vectors corresponds to each set of the first multiple sets of $P \times Q$ transform coefficients, P and Q being positive integers;

generating a block of $P \times Q$ pixel difference data from each set of the first multiple sets of $P \times Q$ transform coefficients;

deriving a block of P×Q pixel data corresponding to each of the first multiple number of motion vectors from the previous frame stored in the first frame memory;

reconstructing a block of P×Q pixel data of the current frame from the block of P×Q pixel difference data and the block of P×Q pixel data from the previous frame; and storing the block of P×Q pixel data of the current frame in the first frame memory.

3. The method according to claim 1, wherein said step of decoding the picture-in-picture signal includes the steps of:

converting said picture-in-picture signal into second multiple sets of P×Q transform coefficients and a second multiple number of motion vectors, wherein each of the second multiple number of motion vectors MV corresponds to each set of the second multiple sets of P×Q transform coefficients and consists of a horizontal vector component MVH and a vertical vector component MVV;

providing multiple subsets of P/N×Q/N transform coefficients including a d.c. coefficient, each of the multiple subsets being derived from each of the second multiple sets of P×Q transform coefficients, wherein P/N and Q/N are integers with N being a reduction ratio for the picture-in-picture with respect to both the horizontal and the vertical sizes of the screen;

generating a block of P/N×Q/N pixel difference data from one set of the multiple subsets of P/N×Q/N transform coefficients;

modifying each of the second multiple number of motion vectors MV into a reduced motion vector MV/N consisting of reduced horizontal and vertical vector components MVH/N and MVV/N;

deriving a block of P/N×Q/N interpolated pixel data corresponding to the reduced motion vector MV/N from the previous frame stored in the second frame memory;

reconstructing a block of P/N×Q/N pixel data of the current frame from the block of P/N×Q/N pixel difference data and the block of P/N×Q/N interpolated pixel data; and storing the block of P/N×Q/N pixel data of the current frame in the second frame memory.

4. The method according to claim 3, wherein each of the P/N×Q/N interpolated pixel data is determined by a pixel represented by the reduced motion vector MV if both of the reduced vector components MVH/N and MVV/N thereof are integers; by two closest pixels to a location represented by the reduced motion vector MV if only one of the reduced vector components MVH/N and MVV/N is an integer; and by four closets pixels to a location represented by the reduced motion vector MV if none of the reduced vector components MVH/N and MVV/N is an integer.

5. The method according to claim 4, wherein P and Q are 8, respectively.

6. An apparatus for use in a digitized video signal decoder for providing a main picture and a picture-in-picture simultaneously on a screen from a plurality of digital video signals received from transmitters, wherein each of the digital video signals has been compressed by using a coding technique involving a motion-compensated differential pulse code modulation and two dimensional discrete cosine transform, said apparatus comprising:

means for selecting a main picture signal and a picture-in-picture signal from the plurality of digital video signals;

first means for decoding the main picture signal, which includes a first frame memory for storing current and previous frames of the main picture;

second means for decoding the picture-in-picture signal by using a set of reduced motion vectors and a reduced number of transform coefficients, which includes a second frame memory for storing current and previous frames of the picture-in-picture; and means for providing a composite image of the main picture and the picture-in-picture from the first and the second frame memories.

7. The apparatus according to claim 6, wherein said first decoding means includes:

means for converting the main picture signal into first multiple sets of P×Q transform coefficients and a first multiple number of motion vectors, wherein each of the first multiple number of motion vectors corresponds to each set of the first multiple sets of P×Q transform coefficients, P and Q being positive integers;

means for generating a block of P×Q pixel difference data from each set of the first multiple sets of P×Q transform coefficients;

means for deriving a block of P×Q pixel data corresponding to each of the first multiple number of motion vectors from the previous frame stored in the first frame memory; and means for reconstructing a block of P×Q pixel data of the current frame from the block of P×Q pixel difference data and the block of P×Q pixel data from the previous frame and providing the block of P×Q pixel data of the current frame to the first frame memory.

8. The apparatus according to claim 6, wherein said second decoding means includes:

means for converting the picture-in-picture signal into second multiple sets of P×Q transform coefficients and a second multiple number of motion vectors, wherein each of the second multiple number of motion vectors MV corresponds to each set of the second multiple sets of P×Q transform coefficients and consists of a horizontal vector component MVH and a vertical vector component MVV;

means for providing multiple subsets of P/N×Q/N transform coefficients including a d.c. coefficient, each of the multiple subsets being derived from each of the second multiple sets of P×Q transform coefficients, wherein P/N and Q/N are integers with N being a reduction ratio for the picture-in-picture with respect to both the horizontal and the vertical sizes of the screen;

means for generating a block of P/N×Q/N pixel difference data from said subset of P/N×Q/N transform coefficients;

means for modifying each of the second multiple number of motion vectors MV into a reduced motion vector MV/N consisting of reduced horizontal and vertical vector components MVH/N and MVV/N;

means for deriving a block of P/N×Q/N interpolated pixel data corresponding to the reduced motion vector MV/N from the previous frame stored in the second frame memory; and means for reconstructing a block of P/N×Q/N pixel data of the current frame from the block of P/N×Q/N pixel difference data and the block of P/N×Q/N interpolated pixel data and providing the block of P/N×Q/N pixel data of the current frame to the second frame memory.

9. The apparatus according to claim 8, wherein each of the P/N ×Q/N interpolated pixel data is determined by a pixel represented by the reduced motion vector MV if both of the reduced vector components MVH/N and MVV/N thereof are integers; by two closest pixels to a location represented by the reduced motion vector MV if only one of the reduced vector components MVH/N and MVV/N is an integer; and by four closets pixels to a location represented by the reduced motion vector MV if none of the reduced vector components MVH/N and MVV/N is an integer.

10. The apparatus according to claim 9, wherein P and Q are 8, respectively.

* * * * *